(12) United States Patent
Brackney

(10) Patent No.: US 8,011,266 B2
(45) Date of Patent: Sep. 6, 2011

(54) GEAR FOR ELIMINATING BACKLASH

(75) Inventor: Chris Brackney, King City, OR (US)

(73) Assignee: Dominie Investment, Inc., Lake Oswego, OR (US)

( * ) Notice: Subject to any disclaimer, the term of this patent is extended or adjusted under 35 U.S.C. 154(b) by 327 days.

(21) Appl. No.: 12/275,003

(22) Filed: Nov. 20, 2008

(65) Prior Publication Data

US 2010/0050799 A1    Mar. 4, 2010

(30) Foreign Application Priority Data

Aug. 28, 2008  (KR) ................. 10-2008-0084446

(51) Int. Cl.
*F16H 55/18* (2006.01)
(52) U.S. Cl. .......................................... 74/440
(58) Field of Classification Search ............... 74/388 PS, 74/409, 425, 440
See application file for complete search history.

(56) References Cited

U.S. PATENT DOCUMENTS

| 4,055,092 | A | * | 10/1977 | Aberg | 74/439 |
| 7,806,016 | B2 | * | 10/2010 | Shimizu et al. | 74/388 PS |
| 2004/0200302 | A1 | | 10/2004 | Kampichler et al. | |
| 2004/0221669 | A1 | * | 11/2004 | Shimizu et al. | 74/388 PS |

FOREIGN PATENT DOCUMENTS

KR    20-1998-060635    11/1998

* cited by examiner

*Primary Examiner* — Vicky A Johnson
(74) *Attorney, Agent, or Firm* — Sherr & Vaughn, PLLC

(57) ABSTRACT

Disclosed herein is a gear for eliminating backlash. The gear includes a rotating shaft having a hollow portion. A first gear is connected to an end of the rotating shaft to be rotated in sync with the rotating shaft, and has on a central portion thereof a connecting protrusion which protrudes forwards. A hole is formed so as to communicate with the hollow portion of the rotating shaft, and a pair of first mounting holes is formed in the first gear along an arc thereof. A second gear is rotatably connected to the connecting protrusion of the first gear and has the same teeth as teeth of the first gear. A cylinder is provided in each of the first mounting holes and connected at both ends thereof to the first gear and the second gear, thus rotating the second gear in one direction. A locking cap is provided on an end of the connecting protrusion of the first gear to prevent the second gear from being eliminated from the first gear.

6 Claims, 5 Drawing Sheets

GEAR FOR ELIMINATING BACKLASH

The present application claims priority to Korean Patent Application No. 10-2008-0084446 (filed on Aug. 28, 2008) which is hereby incorporated by reference in its entirety.

BACKGROUND OF THE INVENTION

1. Field of the Invention

The present invention relates generally to a gear and, more particularly, to a gear for eliminating backlash, in which a second gear is rotatably connected to the front of a first gear, cylinders for rotating the second gear are provided on the first gear, so that clearance between the first and second gears rotating identically with a rotating body rotating forwards and backwards and another gear engaging with the first and second gears is eliminated, thus eliminating backlash, therefore allowing rotating force to be reliably and continuously transmitted by the first and second gears which are rotating forwards and backwards.

2. Description of the Related Art

Generally, when a pair of gears mesh with each other, theoretically, respective gear teeth engage with corresponding tooth spaces. However, actually, clearance occurs between the gear teeth and the tooth spaces because of errors in the manufacturing of gears.

Since power transmission is not smooth because of various factors including variation in radial distances of the gears resulting from manufacturing error, the deformation of the tooth profile or the abrasion of a gear shaft due to a load, and assembly tolerance, some clearance occurs in the back of gear teeth when they engage with each other. That is, backlash occurs.

In other words, backlash is defined as the clearance between the gear teeth in a circumferential direction when the gears engage with each other. When there is no clearance, the gear teeth having the same dimensions cannot engage with each other, so that production tolerance is always present.

Backlash occurs when a pair of gears which engage with each other and rotate in one direction rotate in the opposite direction. The backlash occurs between the gears rotating forwards and backwards, thus undesirably increasing stress and abrasion.

In an optical pickup apparatus using a recording medium rotating forwards and backwards such as a CD or DVD, power transmission for driving light pickup operation is conducted mainly by gears. If backlash occurs between the gears for transmitting power in the optical pickup apparatus, the backlash negatively affects the operation and reliability of the optical pickup apparatus.

That is, when backlash is present between the power transmission gears of the optical pickup apparatus, an error is made in power transmission. Further, play occurs in the pickup operation due to external shocks, so that the pickup operation may deviate from a track of a CD or DVD data surface, thus hindering the data from accurately playing.

In order to solve the problem, various methods have been developed. Among them, a gear for eliminating backlash was developed as shown in FIG. 1 and has been used.

FIG. 1 is a view illustrating a conventional double gear for eliminating backlash.

As shown in the drawing, two gears having the same dimensions are coaxially connected to each other. A support member $1a$ is formed at a predetermined position in the upper surface of the lower gear 1, and an elongated hole $2a$ is formed at a predetermined position in the upper gear 2. Further, a protrusion $2b$ is provided on one wall in the hole $2a$ so that a compression spring 3 is installed between the support member $1a$ of the lower gear 1 and the protrusion $2b$.

Further, locking projections $1b$ are provided on a plurality of places on the upper surface of the lower gear 1, and guide grooves $2c$ are formed on a surface of the upper gear 2 to correspond to portions on which the locking projections $1b$ are formed. The locking projections $1b$ are inserted into the guide grooves $2c$.

In such a conventional double gear for eliminating backlash, the upper gear 2 is pushed in one direction by the elastic force of the spring 3 installed in the elongated hole $2a$ of the upper gear 2. Such a movement of the upper gear 2 is limited when each locking projection $1b$ is locked to one wall of the corresponding guide groove $2c$.

Thus, the elastic force of the spring 3 is always applied to the upper gear 2. The teeth of the upper and lower gears 2 and 1 are staggered. Thus, both sides of a tooth space of another gear engaging with the teeth of the upper and lower gears 2 and 1 are in close contact with the teeth because of the elastic force of the spring 3 which acts on the upper gear 2, so that backlash is minimized.

However, the conventional double gear for eliminating backlash is problematic in that the elastic force of the spring 3 pushing the upper gear 2 in one direction is reduced when the double gear has been used for a lengthy period of time, so that force for continuously pushing the upper gear 2 becomes weak.

This means that the life-span of the conventional double gear for eliminating backlash is short. Therefore, the double gear must be separated from a product so as to replace the spring 3 with a new one, or the product must be replaced with a new one, thus inconveniencing a consumer and deteriorating reliability.

SUMMARY OF THE INVENTION

Accordingly, the present invention has been made keeping in mind the above problems occurring in the related art, and an object of the present invention is to provide a gear for eliminating backlash, in which a second gear is rotatably connected to a first gear, and cylinders for rotating the second gear are provided on the first gear, thus eliminating clearance between the first and second gears and another gear engaging with the first and second gears, therefore eliminating backlash.

Another object of the present invention is to provide a gear for eliminating backlash, in which a first pipe for supplying pressure to each cylinder and a second pipe for discharging pressure from each cylinder are provided through the hollow portion of a rotating shaft and connected to the cylinder, thus keeping a length of the cylinder constant, therefore maintaining a state in which a second gear has been rotated relative to a first gear.

A further object of the present invention is to provide a gear for eliminating backlash, in which a second gear includes a second mounting hole corresponding to a first mounting hole, thus allowing a user to check the state of a cylinder, and allowing repairing and replacing work to be easily performed.

In order to accomplish the above objects, the present invention provides a gear for eliminating backlash including a rotating shaft having a hollow portion, a first gear which is connected to an end of the rotating shaft to be rotated in sync with the rotating shaft, has on a central portion thereof a connecting protrusion which protrudes forwards, with a hole formed so as to communicate with the hollow portion of the rotating shaft, and a pair of first mounting holes formed in the first gear along an arc thereof, a second gear which is rotatably connected to the connecting protrusion of the first gear and has the same teeth as teeth of the first gear, a cylinder which is provided in each of the first mounting holes and connected at both ends thereof to the first gear and the second gear, thus rotating the second gear in one direction, and a locking cap which is provided on an end of the connecting protrusion of the first gear to prevent the second gear from being eliminated from the first gear.

A first pipe and a second pipe for supplying and discharging pressure to and from the cylinder are installed through the hollow portion of the rotating shaft, and an end of each of the first and second pipes is branched so that each of forks of each of the first and second pipes is connected to the cylinder, thus keeping a length of a rod of the cylinder constant, therefore maintaining a state in which the second gear has been rotating relative to the first gear.

The cylinder rotates the second gear using hydraulic pressure.

Further, the second gear includes a second mounting hole corresponding to each of the first mounting holes formed in the first gear, thus allowing a user to check a state of the cylinder provided in the first mounting hole, and allowing repairing and replacing work to be easily performed.

The gear for eliminating backlash further includes a control unit for controlling pressure supplied to the cylinder according to teeth of a gear engaging with the first and second gears, thus adjusting a rotating angle of the second gear.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiment of the present invention will be described with reference to the accompanying drawings.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

Figure 1:
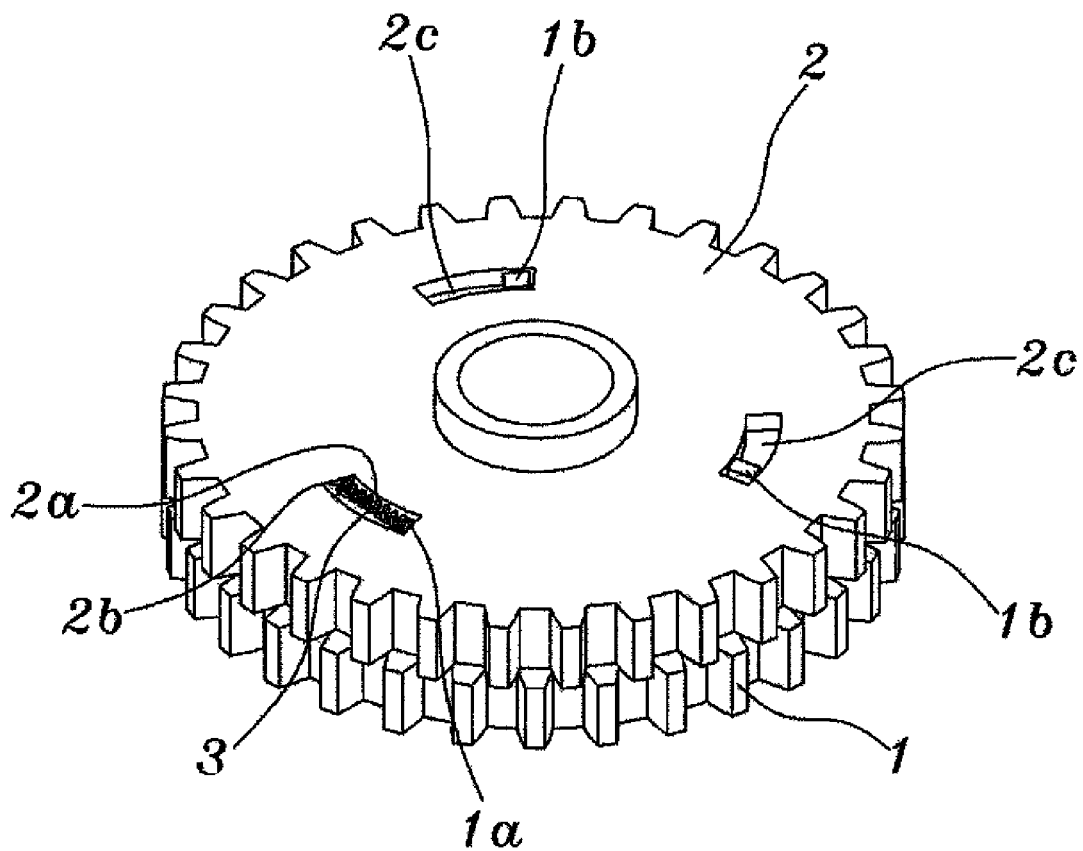
FIG. 1 is a view illustrating a conventional double gear for eliminating backlash.
Figure 2:
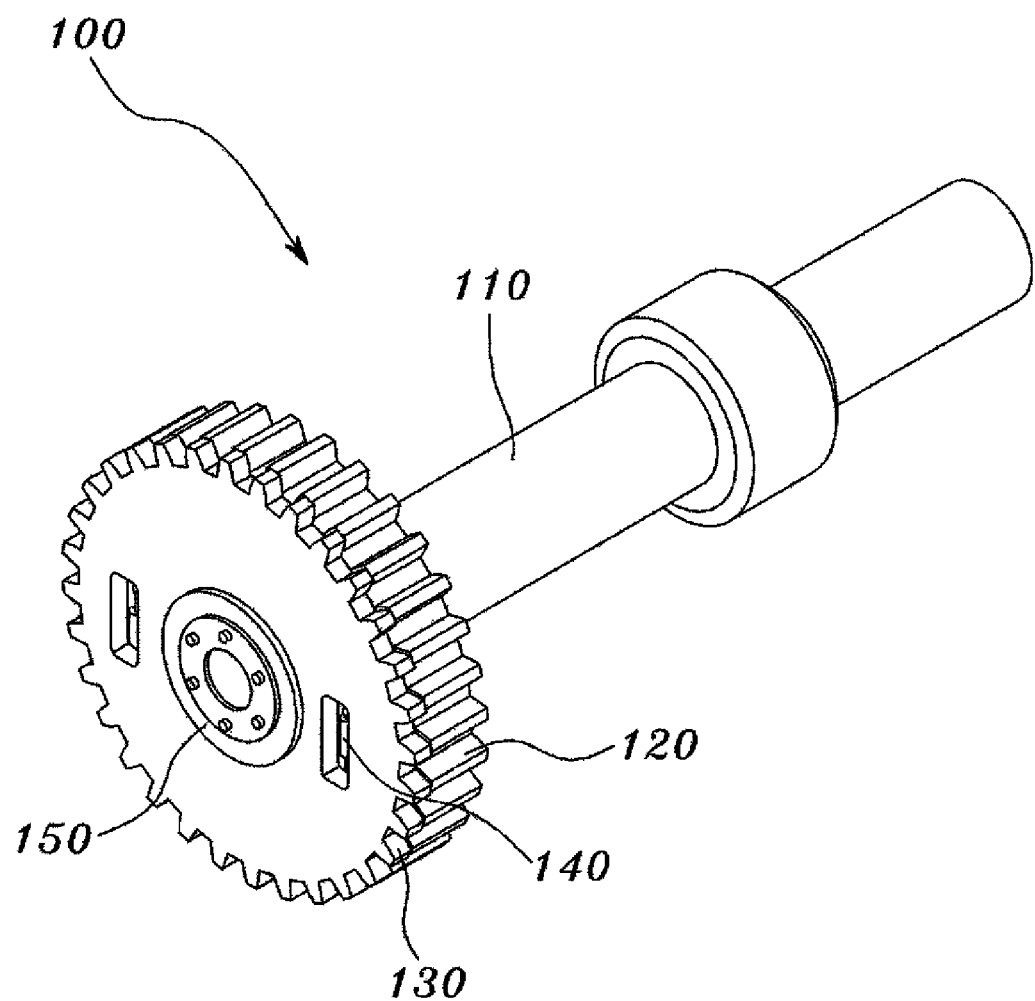
FIG. 2 is a view illustrating a gear for eliminating backlash according to the present invention.
Figure 3:
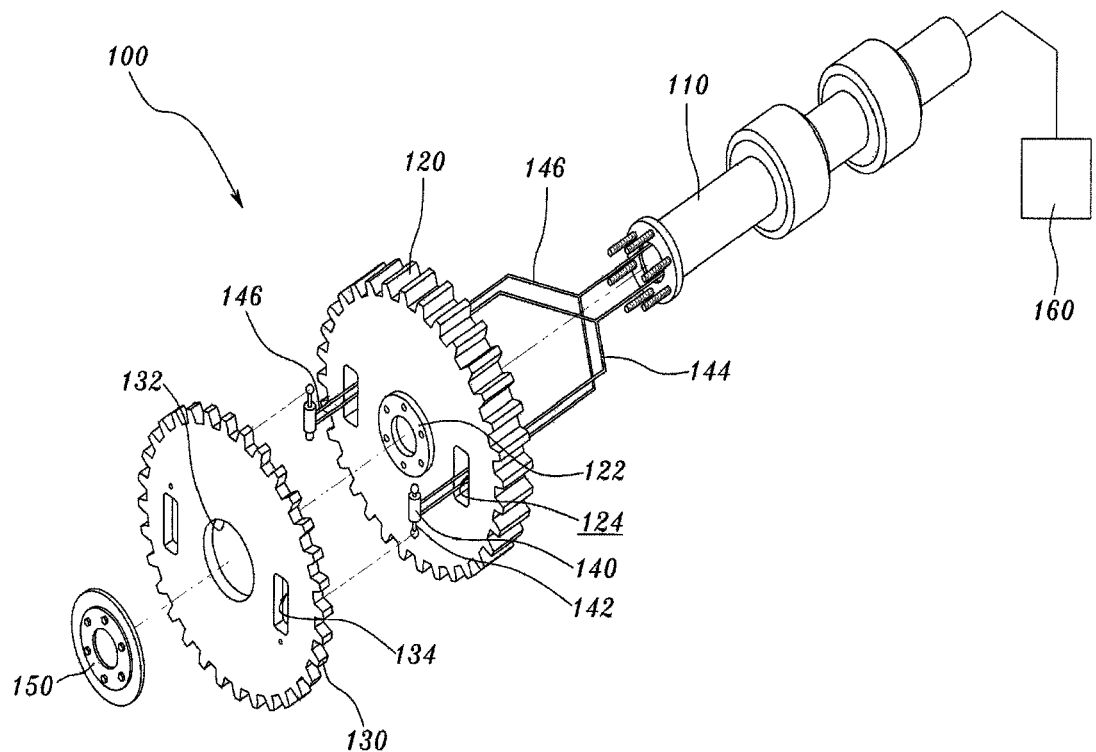
FIG. 3 is an exploded perspective view illustrating the backlash eliminating gear according to the present invention.
Figure 4:
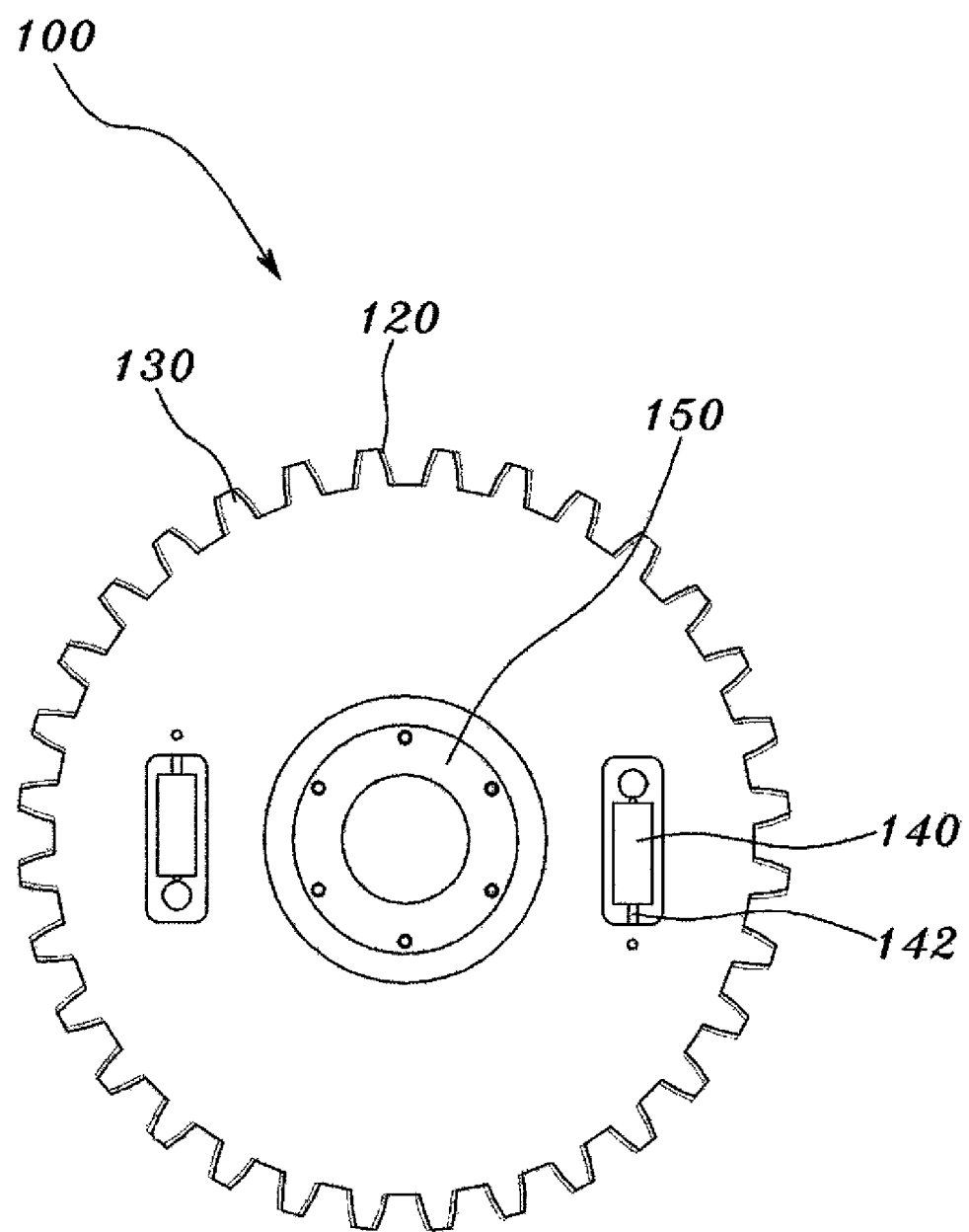
FIG. 4 is a front view illustrating the backlash eliminating gear according to the present invention.
Figure 5:
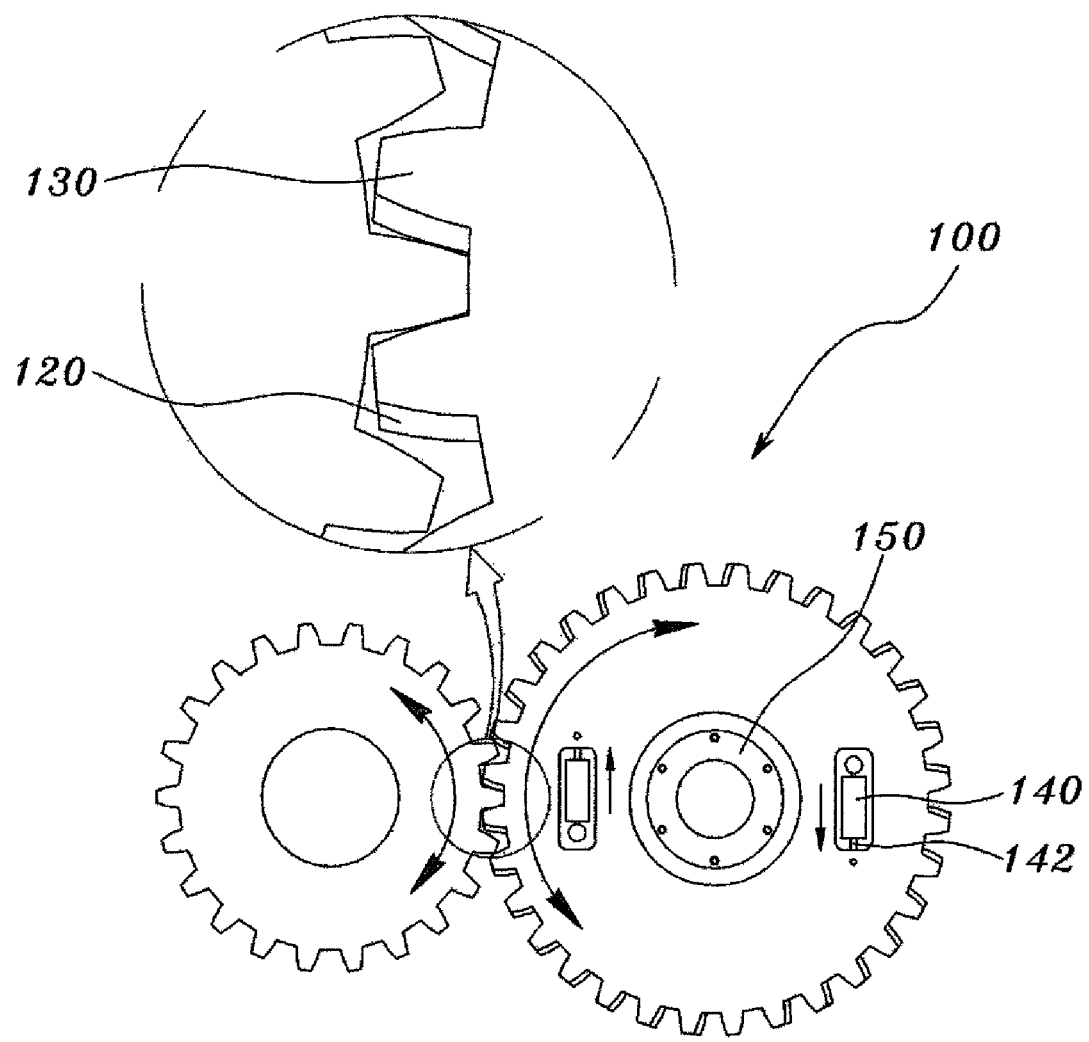
FIG. 5 is a view illustrating the installation state of the backlash eliminating gear according to the present invention.

FIG. 2 is a view illustrating a gear for eliminating backlash according to the present invention, FIG. 3 is an exploded perspective view illustrating the backlash eliminating gear according to the present invention, FIG. 4 is a front view illustrating the backlash eliminating gear according to the present invention, and FIG. 5 is a view illustrating the installation state of the backlash eliminating gear according to the present invention.

As shown in the drawings, the backlash eliminating gear 100 includes a rotating shaft 110, a first gear 120, a second gear 130, cylinders 140 and a locking cap 150. The rotating shaft 110 is rotated by power transmitted thereto and has a hollow portion therein.

The first gear 120 is provided on an end of the rotating shaft 110 in such a way as to rotate in sync with the rotating shaft 110. A connecting protrusion 122 is provided on the central portion of the first gear 120 in such a way as to protrude forwards.

The second gear 130 is connected to the connecting protrusion 122. A connecting hole 132 is formed in the second gear 130 to correspond to the connecting protrusion 122, so that the second gear 130 is connected to the first gear 120.

Here, a hole is formed in the first gear 120 to communicate with the hollow portion of the rotating shaft 110. The hole is formed through the central portion of the connecting protrusion 122.

The hollow portion of the rotating shaft 110 and the hole of the first gear 120 define a passage having the first pipe 144 of the cylinders 140. The first pipe supplies pressure to the cylinders 140, thus rotating the second gear 130 in one direction and maintaining the rotating state.

Further, a pair of first mounting holes 124 is formed in the first gear 120 at predetermined positions along the arc thereof. The cylinders 140 are provided in the first mounting holes 124.

The rod 142 of each cylinder 140 is secured to the second gear 130, thus rotating the second gear 130 relative to the first gear 120. The second gear 130 is rotated by pressure which is supplied and discharged by the first and second pipes 144 and 146 which are provided along the hollow portion of the rotating shaft 110.

Each of the first and second pipes 144 and 146 is branched at an end thereof such that the forks are connected to the respective cylinders 140. One fork of the first pipe 144 and one fork of the second pipe 146 are connected to each cylinder 140, thus supplying or discharging pressure to or from the cylinder 140 and thereby changing the length of the associated rod 142.

In a detailed description, each of the cylinders 140 is identically operated, rotated at a predetermined angle and maintains the rotating state by one first pipe 144 and one second pipe 146, each of which is branched at one end thereof.

When the length of each cylinder rod 142 is changed as such, the second gear 130 is rotated around the central axis of the first gear 120. The second gear 130 is rotated in proportion to the interval between teeth of another gear engaging with the second gear 130, so that the teeth of the second gear 130 contact the teeth of the gear which engages with the second gear 130.

This eliminates backlash when the first and second gears 120 and 130 engage with another gear and rotate in sync therewith. The rotating state of the second gear 130 can be easily maintained by regulating the pressure of the first and second pipes 144 and 146, thus allowing the same rotating force as that of the first gear 120 to be transmitted to another gear.

Here, each cylinder 140 functions to rotate the second gear 130 forwards or backwards by hydraulic pressure. If necessary, pneumatic pressure may be used.

The cylinders 140, the first pipe 144 and the second pipe 146 are installed as follows. The first pipe 144 and the second pipe 146 are installed through the hollow portion of the rotating shaft 110. One end of each of the first and second pipes 144 and 146 branches into two forks.

The forks of each of the first and second pipes 144 and 146 extend from an end of the rotating shaft 110 to the back of the first gear 120 to be connected to the respective cylinders 140 which are installed in the first mounting holes 124. As pressure is supplied through the first pipe 144 and is discharged through the second pipe 146, the cylinders 140 are identically operated, so that the second gear 130 is rotated.

Such a second gear 130 is rotated in the opposite direction by supplying pressure through the second pipe 146 and discharging pressure through the first pipe 144.

In the state where the second gear 130 is rotated as such, pressure of the first and second pipes 144 and 146 is maintained, so that the cylinders 140 cause the second gear 130 to be secured to the first gear 120, and thereby rotating force is transmitted to another gear which rotates in sync with the first gear 120.

Meanwhile, another installation example of the cylinders 140, the first pipe 144 and the second pipe 146 is as follows. The first and second pipes 144 and 146 pass through the hollow portion of the rotating shaft 110 and the holes in the first gear 120 and the locking cap 150 and are connected to the respective cylinders 140.

Here, second mounting holes 134 are formed in the second gear 130 to correspond to the first mounting holes 124 of the first gear 120, thus allowing a user to check the installed state of the cylinders 140 and enabling easy repairing and replacing work.

In another installation example of the first pipe 144, the first pipe 144 passing through the holes in the first gear 120 and the locking cap 150 is connected to the cylinders 140 via the second mounting holes 134 formed in the second gear 130.

Meanwhile, the locking cap 150 is locked to an end of the connecting protrusion 122 provided on the first gear 120, with the hole formed in the locking cap 150 to communicate with the hole of the first gear 120.

The locking cap 150 is provided to prevent the removal or separation of the second gear 130 which is rotatably connected to the connecting protrusion 122 of the first gear 120. The hole in the locking cap 150 is used to install the first pipe 144 according to another installation example of the first pipe 144.

Further, in another installation example of the first pipe 144, the locking cap 150 holds part of each of the first and second pipes 144 and 146, thus allowing the first and second pipes 144 and 146 to rotate identically with the first gear 120 and the rotating shaft 110.

Such a locking cap 150 is fastened to an end of the connecting protrusion 122 of the first gear 120 via an additional fastening member (not shown).

Preferably, a control unit 160 is further provided to control pressure supplied to the cylinders 140 according to the teeth of another gear engaging with the first and second gears 120 and 130, thus adjusting the rotating angle of the second gear 130.

This checks the pitch of another gear engaging with the backlash eliminating gear 100, thus effectively eliminating backlash.

As described above, the present invention provides a backlash eliminating gear, which removes clearance between first and second gears rotating in sync with a rotating body rotating forwards and backwards and another gear engaging with the first and second gears, thus eliminating backlash, therefore allowing rotating force to be reliably and continuously transmitted by the first and second gears which rotate forwards and backwards.

What is claimed is:

1. A gear for eliminating backlash, comprising:
   a rotatable shaft having a hollow portion;
   a first gear connected to an end of the rotatable shaft to be rotated in synchronization with the rotatable shaft, and having on a central portion thereof a connecting protrusion with a hole formed so as to communicate with the hollow portion of the rotatable shaft, with a pair of first mounting holes formed in the first gear along an arc thereof, wherein the first gear has a number of teeth;
   a second gear rotatably connected to the connecting protrusion of the first gear, and having a number of teeth equal to the number of teeth of the first gear;
   a pair of cylinders, with one cylinder provided in each of the first mounting holes, and each having a rod secured to the second gear, thus rotating the second gear in one direction; and
   a locking cap provided on an end of the connecting protrusion of the first gear to prevent the second gear from being eliminated from the first gear.

2. The gear for eliminating backlash as set forth in claim 1, wherein a first pipe for supplying pressure to the cylinders and a second pipe for discharging pressure from the cylinders are installed through the hollow portion of the rotating shaft, and each of the first and second pipes is branched so that each of the first and second pipes is connected to each cylinder, thus keeping a length of the rod of the cylinder constant, thereby maintaining a state in which the second gear has been rotating relative to the first gear.

3. The gear for eliminating backlash as set forth in claim 2, wherein the cylinders rotate the second gear using hydraulic pressure.

4. The gear for eliminating backlash as set forth in claim 1, wherein the cylinders rotate the second gear using hydraulic pressure.

5. The gear for eliminating backlash as set forth in claim 1, wherein the second gear comprises a second pair of mounting holes corresponding to the first pair of mounting holes formed in the first gear, allowing a user to check a state of each of the cylinders provided in the first mounting holes, and allowing repairing and replacing work to be easily performed.

6. The gear for eliminating backlash as set forth in claim 1, further comprising:
   a control unit for controlling pressure supplied to the cylinders according to teeth of a gear engaging with the first and second gears, thereby adjusting a rotating angle of the second gear.

* * * * *